April 29, 1930. H. A. BALLARD 1,756,081
MEASURING MACHINE
Filed Feb 9, 1928 3 Sheets-Sheet 1

INVENTOR
Harrie A. Ballard
By his Attorney
Nelson M. Howard

April 29, 1930.   H. A. BALLARD   1,756,081
MEASURING MACHINE
Filed Feb. 9, 1928   3 Sheets-Sheet 2

INVENTOR

April 29, 1930.   H. A. BALLARD   1,756,081
MEASURING MACHINE
Filed Feb. 9, 1928   3 Sheets—Sheet 3
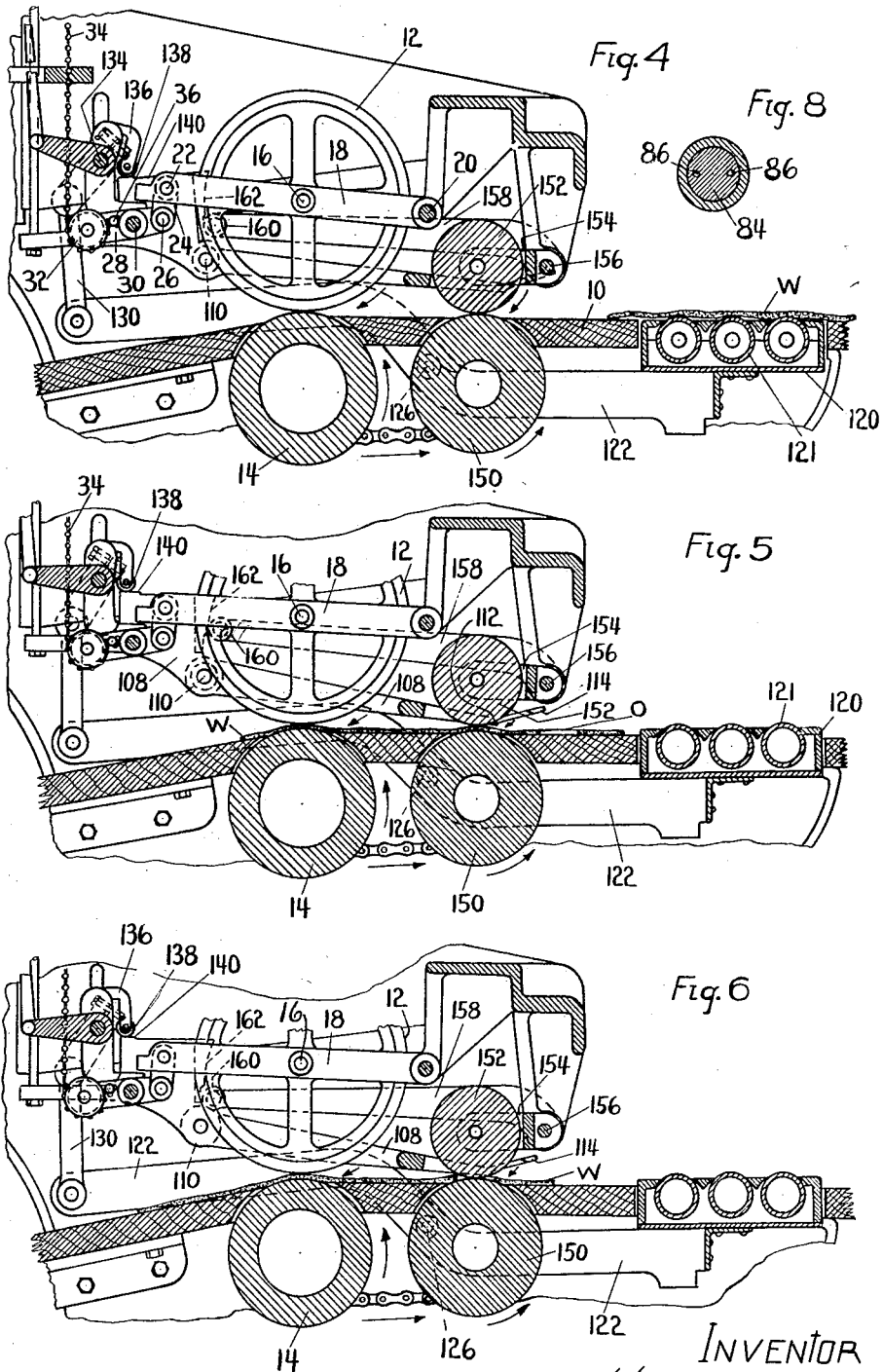

Patented Apr. 29, 1930

1,756,081

UNITED STATES PATENT OFFICE

HARRIE A. BALLARD, OF BEVERLY, MASSACHUSETTS, ASSIGNOR TO THE TURNER TANNING MACHINERY COMPANY, OF PORTLAND, MAINE, A CORPORATION OF MAINE

MEASURING MACHINE

Application filed February 9, 1928. Serial No. 253,065.

This invention relates to measuring machines and is illustrated as embodied in a machine for measuring thickness dimensions of hides, skins, and pieces of leather.

In certain prior machines of the type referred to, termed in the trade weighting machines, there were commonly provided two or more members for engaging a piece of work while on a support to serve as detecting means for measuring thickness dimensions of the work, connections being provided between the work engaging members and a pointer movable over a scale to indicate thickness dimensions of the piece of work in various portions thereof as the work was moved over the work support. Since pieces of leather, whether from hides or skins, vary substantially in thickness even in small areas closely adjacent to each other, the pointer was constantly vibrated during relative movement between the piece of work and the work measuring members, in this way rendering it difficult for the operator to read the indicator and grade the work accordingly. Thus the operator had to be an experienced man capable of deciding upon the thickness of a given piece of work while the pointer was rapidly vibrating, sometimes over several of the indicator characters on the dial. Subsequently these machines were improved to a marked degree by providing means for causing the pointer of the indicator to be set in indicating position when a predetermined transverse line is reached on the piece of work being measured during its movement over the work support. Commonly this line is about six inches from the rear edge of the piece of work moving over the work support. By thus setting the indicator, measurement of the thickness dimension of the piece of work is made along the said line and the indication maintained for observation by the operator. The measurement thus obtained may be used to check the operator's reading of the indicator while the pointer is free to vibrate in accordance with the variations in the thickness dimension of the moving piece of work. In some factories, measurement of a piece of work, such as hide or skin, along a line extending transversely to the backbone line of the hide or skin and located about six inches from the rear edge of the hide or skin is acceptable as the weighting measurement of the given piece of work. In that case, the operator may watch the vibrating pointer more or less intermittently in order to decide upon the proper measurement in case the pointer should stop in a position midway between two indicating characters on the dial of the indicator.

It is an object of the invention to provide a machine of the kind last described which will be especially simple and durable in construction, efficient in operation, and readily responsive to manipulation by the operator.

To these ends, and in accordance with an important feature of the invention, manually operable means is provided, in an organization which comprises means for holding an indicator set in indicating position to indicate the thickness dimension of a piece of work along a transverse line at a predetermined distance from one end of the piece of work, so constructed and arranged that the indicator may be released from its set position by the operator before the entry of a fresh piece of work by pressing upon the work as it is being moved over a certain portion of the work support, the indicator being thus rendered operative to indicate thickness measurements when it is desired to measure a piece of work. Conveniently, the means for holding the indicator in set position is a brake having connections by which it may be controlled by the manually operable member over which the work may be passed to the measuring elements. Preferably, and as shown, the brake is yieldingly applied and subsequently released, i. e. rendered inoperative, by pressing on the manually operable member, the illustrated machine having means under the control of the piece of work for maintaining the brake in inoperative position while the work is passing under the measuring elements. Preferably, too, and as illustrated, a work controlling member comprising a stop member prevents entrance of the work until the brake is released and the indicator freed to operate, the construction and arrangement being such that the work controlling member constitutes part of the means for controlling application of the brake. As shown, feed-in rolls are also provided for moving the piece of work to the measuring elements. Conveniently, one of the feed-in rolls serves as a part of the work controlled means referred to above since it is constructed and arranged to lock the work controlling member in position to hold the brake in inoperative position. When the rear end of the piece of work has passed beyond said feed-in roll the latter drops to its initial position, at once releasing the work controlling member so that when the latter also drops from the rear end of the work the brake may be at once applied to hold the indicator set in indicating position.

The above and other features of the invention, including various details of construction and combinations of parts, will now be more particularly described by reference to the accompanying drawings and thereafter pointed out in the claims.

In the drawings,

Fig. 3 is a front view, partly in section, of the indicator, together with part of the connections between the measuring elements and the indicator;

Fig. 4 is a section of the lower part of the machine, taken along the line IV—IV of Fig. 2 and showing the position of the parts while the machine is not operating;

Fig. 5 is a view similar to Fig. 4 with a piece of work in engagement with the measuring elements;

Fig. 6 is a view similar to Fig. 5 illustrating the position of the parts when an opening in the work is encountered by one or more of the parts which control the indicator;

Fig. 8 is a section of a dash pot along the line VIII—VIII of Fig. 1.

Figure 1:
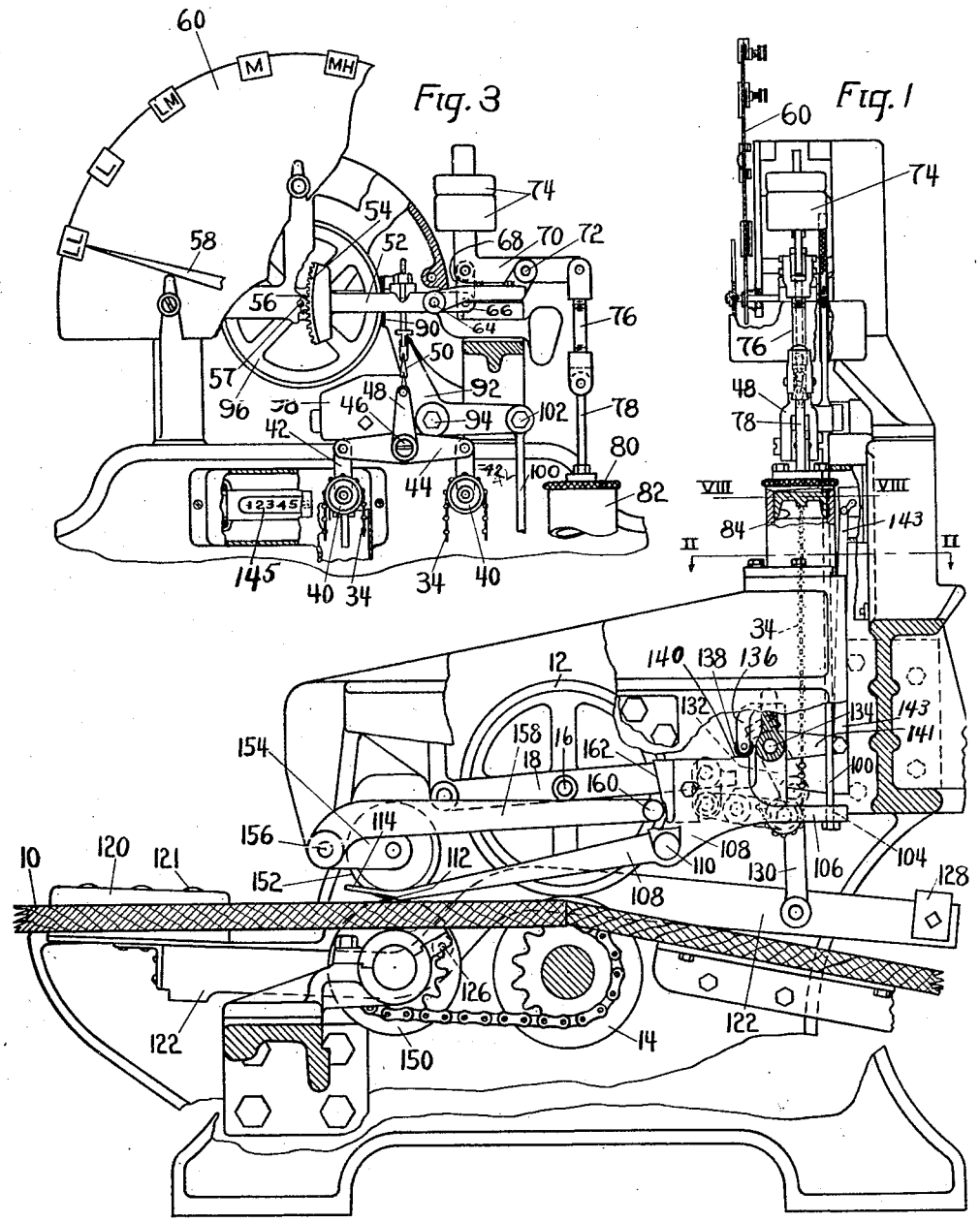
Fig. 1 is a side view, partly in section, of a thickness measuring machine illustrating one embodiment of the invention.

In the illustrated thickness measuring machine there is provided a work supporting table 10 over which a hide, skin, leather, or other piece of work $w$ may be fed to a series of measuring elements, one of which is shown at 12, the elements 12 being placed side by side and the series extending across the machine. The elements 12 are wheels mounted for up and down movement to measure the work and arranged to co-operate for work feeding purposes with a bed roll 14 mounted in bearings in the frame of the machine and having a portion thereof projecting upwardly through a slot in the table 10 so that the piece of work W may be engaged by the wheels 12 to press the work against the bed roll to feed the work while it is being measured by the measuring wheels during up and down movement of the latter.

Each measuring wheel 12 is supported by one of a series of shafts 16 each mounted in a yoke-shaped lever 18 pivoted at 20 (Fig. 4) in the frame of the machine and having its other end pivotally connected at 22 to a link 24 pivoted at 26 to a lever 28 rotatable upon a shaft 30 (common to all of the levers 28) and carrying at its other end a grooved member 32 around which passes a chain 34, an end of which is secured to a pin 36 adjacent to the grooved member 32. The other end of each chain 34 is connected to a pin 36 on the next adjacent lever 28 associated with a measuring wheel 12 which serves as the other of a pair of measuring wheels which operate through the same chain 34 to pull downwardly upon a pulley 40 (Fig. 3) carried by a link 42 pivotally attached to one end of an equalizer bar 44, the latter being pivoted at 46 to a link 48 arranged to be suspended by a chain 50 from a lever 52 which carries a segmental rack 54 arranged in mesh with a pinion 56 on a shaft 57, both pinion and shaft being secured to a pointer 58, the pointer being movable over a dial 60.

When one or more of the wheels 12 are lifted by reason of the entrance of a piece of work between the measuring wheels and the bed roll 14, the chain 34 is pulled downwardly to operate the lever 52, which is geared in the manner described, to operate the pointer 58 so that the latter will move over the dial 60. As illustrated, there are four measuring wheels 12 for contacting with a piece of work passing over the bed roll 14, and, therefore, it is clear that at any given time the thickness of the work is measured at four points spaced from each other along a line extending transversely of the direction of feed of the work, the averaging of the four thickness dimensions being accomplished through the chains 34 and the equalizer bar 44 so that the average vertical movement of all of the wheels 12 is transmitted to the pointer 58 through the pointer operating lever 52, the pointer indicating the average thickness of the work at the four spaced points by reference to characters on the dial 60.

For damping the movements of the pointer 58, that is, for lessening the extent and rapidity of its vibrations, the machine is provided with a dash pot having connections with the pointer operating lever 52 which will now be described. The lever 52 is pivoted at 64 to a stationary part of the machine frame and has its projecting end portion 66 pivotally connected to a link 68, in turn pivoted to a lever 70 pivotally carried at 72 by a projection extending from the machine frame. One end of the lever 70 is provided with one or more weight members 74 and at its other end the lever 70 is pivotally connected by an extensible link 76 to a piston rod 78 which extends through a cap 80 of a cylindrical dash pot 82 to engage a piston 84 within the dash pot 82, the dash pot being filled with an oil or other suitable fluid which may readily pass through perforations 86 (Fig. 8) in the piston 84 so that movement of the pointer operating lever 52 may take place readily enough for practical purposes but have its movements damped so as to prevent excessive vibration, thus making it easier for the operator to read the indicator during the passage of the pieces of work.

For holding the indicator set in indicating position to facilitate reading of the indicator by the operator and to maintain a record of the measurement along a given line until a fresh piece of work is inserted, the machine has a brake 90 upon a lever 92 pivoted at 94 upon the frame of the machine, the brake 90 being arranged to be applied to a brake wheel 96 secured upon the shaft 57 to which the pointer is attached. Hence, when the wheel 96 is held by the brake in a selected position, the pointer 58 is held in indicating position with respect to some one of the characters upon the dial 60. Preferably, and as shown, the brake 90 is applied by a weight 98 (Fig. 3), the brake being released by pulling down upon a rod 100 pivoted at 102 to the lever 92 and at its lower end slidably connected at 104 with an end portion 106 of a stop lever 108 pivoted at 110 in the frame of the machine. At its forward end the stop lever 108 is provided with a stop shoulder 112 and with an upwardly directed portion 114 to guide the forward edge of the incoming piece of work against the stop shoulder 112. The construction and arrangement are such that it is necessary to withdraw the stop before work may be inserted for the operation of the measuring elements. When the stop is withdrawn, the stop lever causes release of the brake 90 so that the pointer is rendered operative upon introducing each fresh piece of work.

Figure 2:
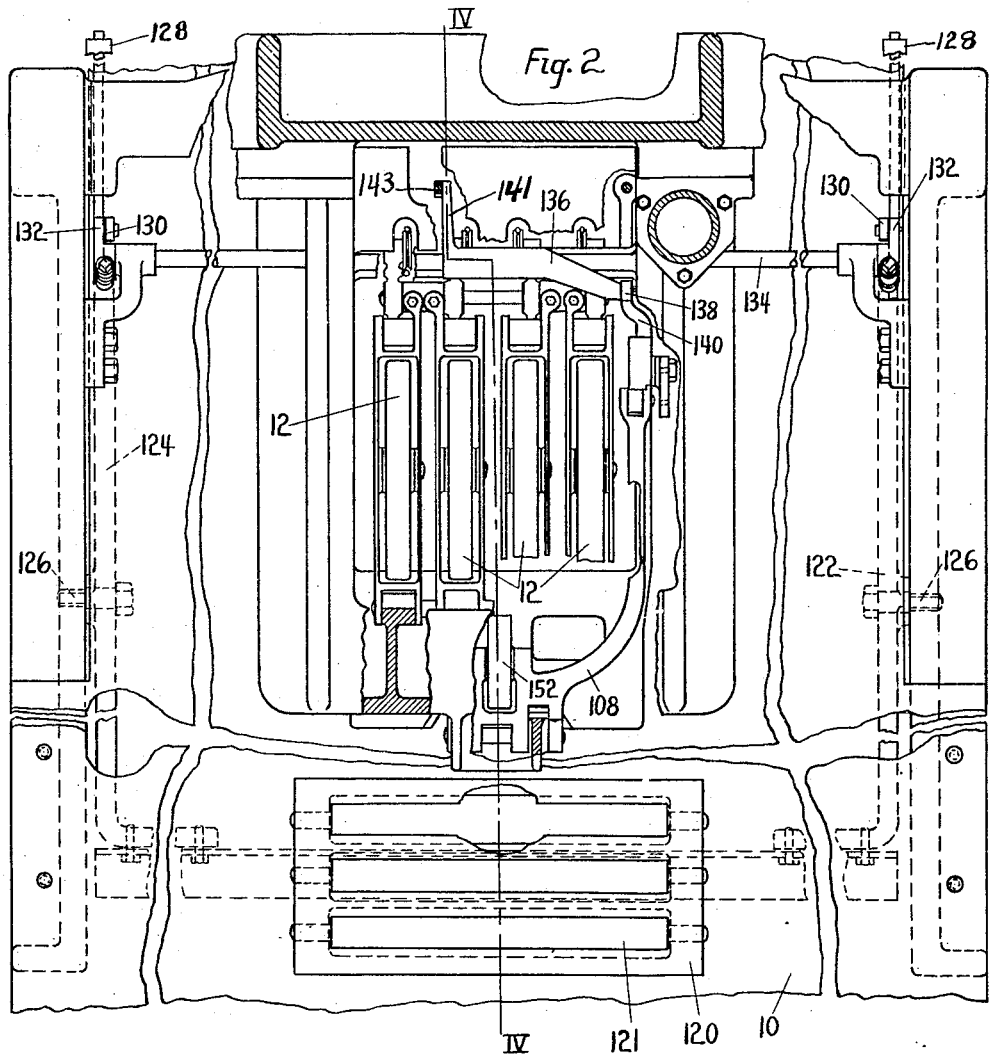
Fig. 2 is a view, partly in section, along the line II—II of Fig. 1 looking in the direction of the arrows.
Figure 7:
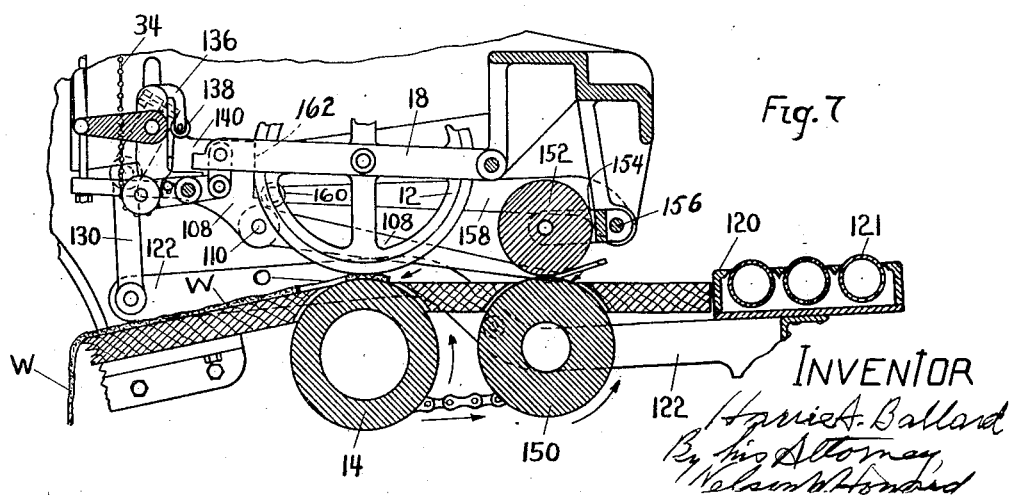
Fig. 7 is a view similar to Fig. 4 showing the work just leaving a measuring element.

The means for withdrawing the stop and for releasing the brake to render the pointer operative is manually operable and comprises a plate 120 mounted in a slot in the forward edge of the table 10 and connections between the plate 120 and the stop lever 108 to operate the latter. Preferably and as shown the plate 120 has rollers 121 mounted therein to facilitate movement of a piece of work over the plate while the latter is being depressed by the operator. Connected to the plate 120 at their forward ends are two levers 122, 124, (Fig. 2) one at each side of the table 10 and pivoted between their ends by pivots 126 to the frame work of the machine. At their rear ends these levers are extended to carry weights 128 adjustable on the levers so as to counterbalance, to a great extent, the weight of the plate 120. Pivoted to each lever 122, 124 near its rear end is a link 130 also pivoted, at its upper end, to an arm 132 rigidly secured to a shaft 134 extending across the machine and supported in bearings furnished by stationary brackets carried by the machine frame. Upon manually depressing the plate 120, the shaft 134 will be rotated in a counterclockwise direction. Secured to the shaft 134 at a point near the middle thereof is an arm 136 (Figs. 1 and 2) having at its free end a roll 138 to contact with a surface on an upwardly projecting portion 140 of the stop lever 108. It will be clear that upon depression of the plate 120 the stop lever 108 is rocked about its pivot 110 to lift its stop shoulder 112 away from the table 10. At the same time the portion 106 of the stop lever 108 is depressed to pull down upon the rod 100, thereby moving the brake 90 away from the brake wheel 96 so that the pointer 58 is free to vibrate in accordance with the vertical movements of the measuring wheels 12. Secured to the shaft 134 is an arm 141 shown integral with arm 136 (Fig. 2) to which is pivotally connected the lower end of link 143 which is operative to operate a counter 145 (Fig. 3) of any well-known make.

For preliminarily feeding the work to the measuring wheels 12, the machine has a roll 150 mounted in bearings furnished by the machine frame and having a portion projecting through a slot in the table 10 for cooperation with a feed roll 152 above the lever of the table 10, the said feed roll 152 being mounted in the short arm 154 of a double armed lever pivoted at 156 in the machine frame and having a long arm 158 which extends rearwardly and is provided with a roll 160 to engage a surface cam 162 secured to the lever 108 to lock the latter lever with the stop 112 in raised, inoperative position. The construction is such that the work controlled roll 152 is moved upwardly by the entering end of the work to lock the lever 108 with its stop portion 112 in raised inoperative position the brake 90 being also locked in inoperative position. If, in the feeding of the work, an opening such as that shown at O should be large enough to permit the wheel 152 to drop into contact with the feed roll 150 the stop lever 108 is unlocked. The lever 108 does not, however, drop into contact with the table since the width of the forward end of the stop lever 108 is great enough to rest astride any opening likely to be present in the leather pieces to be measured. In other words, the stop lever 108 has a broad forward end to rest upon the work upon each side of any opening or perforation even of large size, so that the brake 90 is maintained in inoperative position, thus permitting the pointer to vibrate and the measuring to proceed. When the roll 152 and the lever 108 both drop off the rear end of a piece of work, the brake 90 is instantly set to hold the pointer in indicating position. In the illustrated machine, this occurs when the rear end of the piece of work is about six inches from the measuring wheels 12. Hence the measurement indicated by the set pointer is taken along a line about six inches from the rear end of the piece of work. This measurement may be accepted as the thickness measurement of the piece of work or as a check upon the operator's observations of the vibrating pointer during the passage of the piece of work.

In operating the machine illustrated in the drawings, a piece of work is placed upon the table 10 with a portion thereof resting upon the plate 120 which is located directly in front of the feeding-in rolls 150, 152. Since the stop lever 108 is normally so positioned that the stop shoulder 112 will prevent entrance of the forward edge of the work into the grip of the feeding-in rolls, the operator is compelled to depress the plate 120. When the plate is depressed by the operator exerting downward pressure as the piece of leather is shoved over the plate, the stop 112 is moved upwardly out of the way and at the same time the brake 90 is removed from the brake wheel 96 so that the pointer 58 is rendered operative to indicate the thickness dimensions of the piece of work as it is passing along under the measuring wheels 12. When the rear end of the work has passed the feed-in roll 152 and permitted it and the lever 108 to drop into contact with the table 10, the brake 90 is instantly set against the wheel 96 to hold the pointer 58 in indicating position. The operator may then readily read the indicator and have that piece of work placed upon the proper pile. As heretofore stated, an opening in a piece of work even if of a size large enough to permit the wheel 152 to drop into contact with the lower feed wheel 150, does not interrupt proper operation of the machine. As long as the forward end of the stop lever 108 rests upon the surface of the leather it maintains the brake 90 in released or inoperative position so that the indicator remains in operation. It is presumed that the operator will watch the pointer 58 during the passage of each piece of work under the measuring wheels 12 so that he may have a fairly accurate idea of the thickness dimensions of the piece of work in different parts of its length and thus be able to check the final reading when the brake 90 becomes operative to hold the pointer in set indicating position. If, for instance, the pointer 58 should stop substantially half way between two of the indicating characters, for example, between L and LM and if the operator has been watching the indicator during a part, at least, of the time that the work has been passing through the machine, he will have noticed whether the pointer vibrated the greater part of the time in the neighborhood of station LM or station L and will make his final decision accordingly. Since, however, most manufacturers are satisfied with the thickness dimension along a line about six inches from the butt end of each skin it is altogether likely that in most cases the indication furnished by the pointer 58 when in set position will be satisfactory.

Having thus described my invention, what I claim as new and desire to secure by Letters Patent of the United States is:

1. In a measuring machine, a support for a piece of work to be measured, an element for contacting with a piece of work on the support to measure a dimension thereof, an indicator, connections between the measuring element and the indicator to operate the latter, means for holding the indicator set in indicating position, and manually operable means located in the work support and readily accessible for controlling the holding means for the indicator.

2. In a measuring machine, a support for a piece of work to be measured, an element for contacting with a piece of work on the support to measure a dimension thereof, an indicator, connections between the measuring element and the indicator to operate the latter, means for holding the indicator set in indicating position, and a member normally below the path of the work and arranged to be readily operable by the operator while moving the work over the work support to control the holding means for the indicator.

3. In a measuring machine, a support for a piece of work to be measured, an element for contacting with a piece of work on the support to measure a dimension thereof, an indicator, connections between the measuring element and the indicator to operate the latter, means for holding the indicator set in indicating position, and a member mounted in the work support below the path of the work and arranged to be operated by the operator while moving the work over the work support for controlling the holding means for the indicator.

4. In a measuring machine, a support for a piece of work to be measured, an element for contacting with a piece of work on the support to measure a dimension thereof, an indicator, connections between the measuring element and the indicator to operate the latter, and means for holding the indicator set in indicating position, said work support having a work supporting portion movable to move the holding means for the indicator to inoperative position.

5. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, manually operable means for releasing the brake, and means for preventing introduction of a piece of work until the brake has been manually released.

6. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, and a member over which the work may be passed to the measuring element manually operable for controlling the brake.

7. In a measuring machine, a support for a piece of work to be measured, an element for contacting with a piece of work in the support to measure a dimension thereof, an indicator, connections between the measuring element and the indicator to operate the latter, a brake for holding the indicator set in indicating position, and a member over which the work may be passed to the measuring element manually operable for causing the brake to be moved to inoperative position with respect to the indicator.

8. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, and means below the path of the work and readily accessible for rendering the brake inoperative upon introducing a new piece of work and pressing it against said means.

9. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, means for yieldingly applying the brake, and manually operable means located in the work support and readily accessible for rendering the brake inoperative upon introducing a new piece of work.

10. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, manually operable means for rendering the brake inoperative prior to inserting a piece of work beneath the measuring element, and work controlled means for holding the brake in inoperative position during the passage of the work.

11. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, manually operable means for rendering the brake inoperative before presenting a piece of work to the measuring element, and a member arranged to rest upon the work and having a connection for holding the brake in inoperative position.

12. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, manually operable means for rendering the brake inoperative before presenting a piece of work to the measuring element, and a roll for contacting with a surface of the work and having a connection for holding the brake in inoperative position.

13. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, manually operable means for rendering the brake inoperative before presenting a piece of work to the measuring element, a work controlling member operative also for maintaining the brake in inoperative position, and a roll for contacting with the upper surface of the work and having connections for locking the work controlling member in brake releasing position.

14. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, manually operable means for releasing the brake before presenting a piece of work to the measuring element, and a member spaced a predetermined distance from the measuring element and arranged to hold the brake in releasing position and subsequently to drop off of the rear edge of the work to permit the brake to be set at a predetermined point in the relative movement of the piece of work and the measuring element.

15. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, manually operable means for releasing the brake and for presenting a piece of work to the measuring element, and a member arranged to be controlled by the piece of work to hold the brake in releasing position.

16. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, manually operable means for rendering the brake inoperative prior to inserting a piece of work beneath the measuring element, and work controlled means for holding the manually operable means in brake-controlling position.

17. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, means for yieldingly applying the brake, manually operable means for rendering the brake inoperative prior to inserting a piece of work beneath the measuring element, and work controlled means for holding the manually operable means in brake-controlling position.

18. In a measuring machine, a support for a piece of work to be measured, an element for contacting with a piece of work on the support to measure a dimension thereof, an indicator, connections between the measuring element and the indicator to operate the latter, a brake for holding the indicator set in indicating position arranged for control by the operator, and a stop for preventing entrance of a piece of work until the brake has been released by the operator.

19. In a measuring machine, a support for a piece of work to be measured, an element for contacting with a piece of work on the support to measure a dimension thereof, an indicator, connections between the measuring element and the indicator to operate the latter, a brake for holding the indicator set in indicating position arranged for control by the operator, a work controlled member spaced at a predetermined distance from the measuring element and operated by the work to set the brake so that the indicator may be held by the brake after the passage of the work, and a stop for preventing entrance of a piece of work until the brake has been released by the operator.

20. In a measuring machine, a support for a piece of work to be measured, an element for contacting with a piece of work on the support to measure a dimension thereof, an indicator, connections between the measuring element and the indicator to operate the latter, a brake for holding the indicator set in indicating position, a movable work supporting member for controlling the brake, and a member controlled by the work for causing setting of the brake after the work has passed said member during its movement beneath the work measuring member.

21. In a thickness measuring machine, a support for a piece of work to be measured, a plurality of elements for contacting with a piece of work on the support to measure thickness dimensions thereof, an indicator, connections between the measuring elements and the indicator to operate the latter, a brake for holding the indicator set in indicating position, a manually operable member for releasing the brake prior to presenting a piece of work to the measuring element, a roll for contacting with the upper surface of the piece of work on the work support, and a lock controlled by the roll for holding the brake in releasing position.

22. In a thickness measuring machine, a support for a piece of work to be measured, a plurality of elements for contacting with a piece of work on the support to measure thickness dimensions thereof, an indicator, connections between the measuring elements and the indicator to operate the latter, a brake for holding the indicator set in indicating position, a manually operable member for moving the brake to releasing position before presenting a piece of work to the measuring element, a member having a portion to serve as a stop to prevent introduction of a piece of work until the brake has been released by operation of the manually operable member, and a member arranged to be controlled by the work for locking the stop member in raised position during the passage of the work.

23. In a thickness measuring machine, a support for a piece of work to be measured, a plurality of elements for contacting with a piece of work on the support to measure thickness dimensions thereof, an indicator, connections between the measuring elements and the indicator to operate the latter, a brake for holding the indicator set in indicating position, a manually operable member for moving the brake to releasing position before presenting a piece of work to the measuring elements, a member having a portion to serve as a stop to prevent introduction of a piece of work until the brake has been released by operation of the manually operable member, and a member arranged to be controlled by the work for locking the stop member in raised position during the passage of the work, said locking member serving also to lock the brake in releasing position until said locking member runs off the rear end of the work.

24. In a thickness measuring machine, a support for a piece of work to be measured, a plurality of elements for contacting with a piece of work on the support to measure thickness dimensions thereof, an indicator, connections between the measuring elements and the indicator to operate the latter, a brake for holding the indicator set in indicating position, a manually operable member for moving the brake to releasing position before presenting a piece of work to the measuring elements, a member having a portion to serve as a stop to prevent introduction of a piece of work until the brake has been released by operation of the manually operable member, and a roll for contacting with the upper surface of the piece of work in predetermined spaced relation to the measuring element and having a connection for holding both the stop member and the brake in inoperative positions, said roll being adapted to drop off the rear end of the work to release the stop and to cause setting of the brake.

25. In a thickness measuring machine, a support for a piece of work to be measured, a plurality of elements for contacting with a piece of work on the support to measure thickness dimensions thereof, an indicator, connections between the measuring elements and the indicator to operate the latter, a brake for holding the indicator set in indicating position, manually operable means for releasing the brake before presenting a piece of work to the measuring elements, and a feed-in roll for feeding the work to the measuring elements, said roll contacting with the upper surface of the work and having a connection for holding the brake in releasing position.

26. In a thickness measuring machine, a support for a piece of work to be measured, a plurality of wheels for contacting with a piece of work on the support to measure thickness dimensions, thereof, means for feeding the work to the wheels comprising a feed-in roll, an indicator, connections between the measuring wheels and the indicator to operate the latter, a brake for holding the indicator set in indicating position, and manually operable means for releasing the brake before presenting a piece of work to the measuring wheels, said feed-in roll being spaced a predetermined distance in front of the measuring wheels and arranged to hold the brake in releasing position and subsequently to drop off of the rear edge of the work to permit the brake to be set at a predetermined point in the movement of the piece of work under the measuring wheels.

27. In a thickness measuring machine, a support for a piece of work to be measured, a plurality of wheels for contacting with a piece of work on the support to measure thickness dimensions thereof, an indicator, connections between the measuring wheels and the indicator to operate the latter, a brake for holding the indicator set in indicating position, manually operable means for releasing the brake, a work controlled member spaced at a predetermined distance in front of the measuring wheels and operated by the work to set the brake so that the indicator may be held by the brake after the passage of the work, and a stop for preventing entrance of a piece of work until the brake has been released by the operator.

In testimony whereof I have signed my name to this specification.

HARRIE A. BALLARD.